Dec. 6, 1955    W. G. STOECKICHT    2,725,763
EPICYCLIC GEARS
Filed Aug. 23, 1951
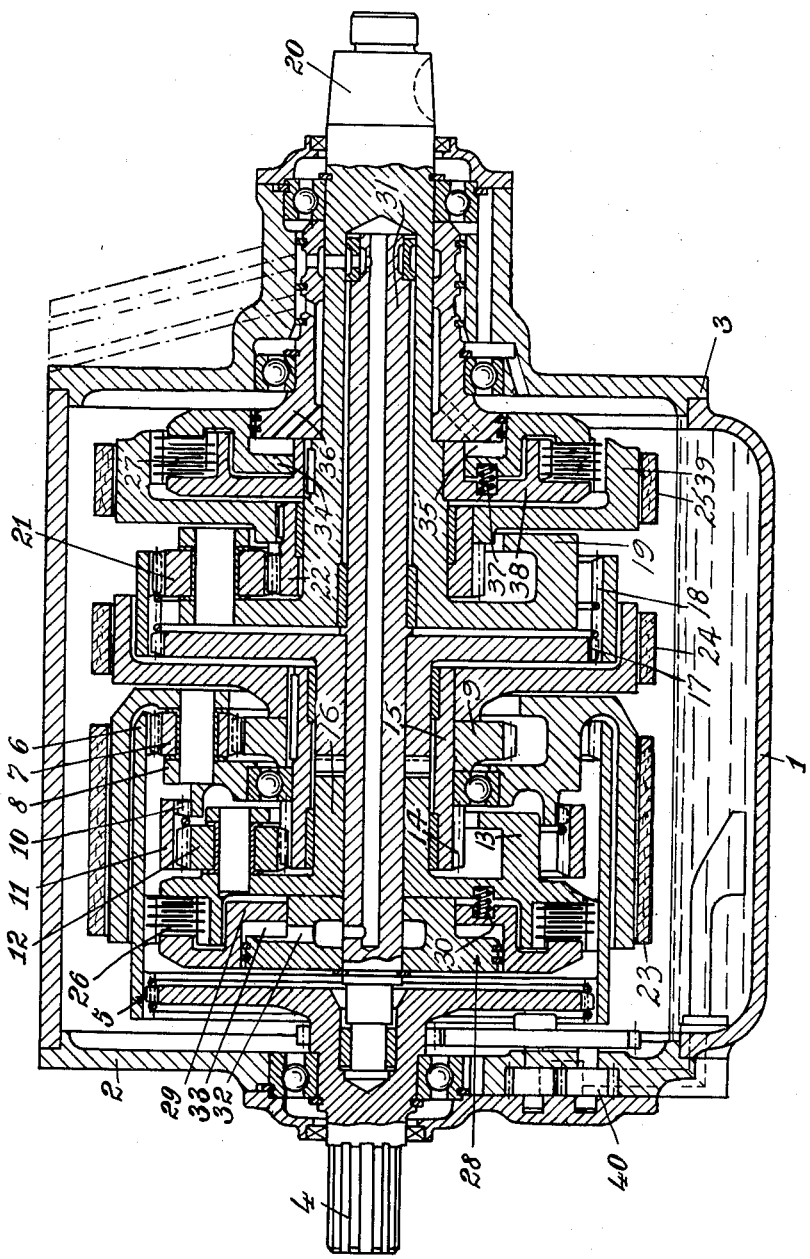
Inventor:
Wilhelm G. Stoeckicht
By [signature]
Attorney

United States Patent Office 2,725,763
Patented Dec. 6, 1955

2,725,763

EPICYCLIC GEARS

Wilhelm G. Stoeckicht, Munich-Sollin, Germany

Application August 23, 1951, Serial No. 243,226

Claims priority, application Germany August 30, 1950

4 Claims. (Cl. 74—763)

This invention relates to epicyclic gears and more particularly to epicyclic gears suitable for automobile transmissions and having two sets of epicyclic gears in series with one another, it being appreciated that by the expression "epicyclic gear" is meant a gear train comprising essentially an inner sun gear, an outer gear ring, in the form of an internally toothed annulus, and intermediate planetary pinions engaged between the sun gear and the outer gear and carried by a planet carrier.

It is an object of the invention to provide an epicyclic gear assembly in which all the gear train elements participate in the transmission of power so that there is no uneconomical dragging around of any idle gear components.

It is also an object of the invention to provide an epicyclic gear assembly in which the driving torque is utilized to act upon the gear assembly in such manner that the applied power, by being applied to a relatively large size gear wheel of a first epicyclic gear train is small compared with the power transmitted from a second epicyclic gear train. In this way favorable conditions are obtained for the tooth loads and for the bearing loads, because the driving torques act upon a gear wheel of relatively large pitch-circle diameter and therefore involves relatively small tooth pressures. The potential power, also known as apparent power, is therefore small in the first epicyclic gear train in comparison with the power transmitted. Since the magnitude of the transmission losses corresponds to the magnitude of the potential power, the gear efficiency is accordingly enhanced.

The invention also has for its object to provide an epicycle gear assembly having further features and advantages which will be more fully disclosed and will be apparent to those skilled in the art from a consideration of the following description with reference to the accompanying drawing and the appended claims.

The accompanying drawing is a longitudinal section through one gear assembly in accordance with the invention.

Referring to the drawing, in a casing 1, with combined end covers and bearing housings 2 and 3, driving shaft 4 is rotatably supported, which, by way of a tooth coupling 5, drives a relatively large internally toothed gear ring 6. With the teeth of this gear ring 6 there mesh epicyclic planet pinions 7, which are rotatably supported upon planet carrier 8 and also mesh with the teeth of a relatively small sun gear 9. The members 6, 7, and 8, and 9 together form one epicycle gear train.

The planet carrier 8 is connected by way of a tooth coupling 10 with a relatively large internally toothed gear ring 11 with the teeth of which there mesh epicyclic planet pinions 12, which are rotatably mounted upon planet carrier 13. The pinions 12 also mesh with the teeth of sun wheel 14 which, by means of a sleeve 15, is connected fast with the sun gear 9. The parts 11, 12, and 13, and 14 form a second epicyclic gear train.

Of these two epicyclic gear trains, the larger outer gear ring 6 of the first gear train acts as a driving member, while the planet carrier 13 of the second gear train acts as a driven member.

The planet carrier 13 is connected by way of a hollow shaft 16 and a tooth coupling 17 with the outer internally toothed gear ring 18 of a third epicyclic gear train, the planet carrier 19 of which is connected with the driven shaft 20 of the entire gear.

The planet pinions 21, rotatably supported upon the planet carrier 19, mesh on the one hand with the outer gear ring 18 and on the other hand with the sun wheel 22.

The planet carrier 8, and with it the outer gear ring 11, are capable of being braked by a brake 23, which may be hydraulically actuated. In a corresponding manner the two sun wheels 9 and 14, connected fast with one another, can be braked by a brake 24, which may also be hydraulically actuated. A further brake 25 serves for braking the sun wheel 22.

Two friction clutches 26 and 27 are also provided. By means of the clutch 26 the outer gear ring 6 of the first epicyclic gear train can be coupled with the planet carrier 13, whereby the gear members 6, 7, 8, 9 and 11, 12, 13, 14 are connected fast with one another and the two epicyclic gear trains revolve as a solid block.

A hydraulic pressure cylinder 28 with a piston 29 serves to actuate the friction clutch 26. The piston 29 is restored to its normal idle position by compression springs 30, which bear upon the planet carrier 13. The piston is actuated by oil under pressure, which passes through the hollow interior of a shaft 31, by way of a duct 32, into the working cylinder space 33.

Similarly for the clutch 27, a piston 34 is provided with a working cylinder space 35, into which liquid under pressure can be introduced through a duct 36. Compression springs 37 bear on the one hand against the piston 34 and on the other hand against a clutch body 38, which is connected with the planet carrier 19 and carries a group of the clutch friction discs. The other group of the clutch friction discs is carried upon a brake body 39, which is connected with the sun wheel 22 and upon which brake body 39 the brake 25 also acts.

The liquid, preferably oil, for the hydraulic actuation of the clutches 26 and 27 and of the brakes 23, 24 and 25, is subjected to pressure by a toothed wheel pump 40, which is arranged in the combined end cover and bearing housing 2. With appropriate actuation and conduits, the pumps force the liquid into the working spaces of the brakes 23, 24, 25 or of the clutches 26, 27.

The gear has four forward speeds and one reverse speed, and works in the following manner:

In the first forward speed, with the greatest ratio of reduction, the brakes 24 and 25 are applied. From the driving shaft 4, by means of the larger outer gear ring 6, the planet carrier 8 is driven, and revolves around the axis of the gear, the sun wheel 9 being now held stationary by the action of the brake 24, and the planet pinions 7 revolving with their carrier 8 around the sun wheel 9. With the planet carrier 8 also connected with the outer gear ring 11 of the second epicyclic gear train this gear ring 11 is also driven, and this gear ring 11, since the sun wheel 14 is also held stationary by the action of the brake 24, drives the planet carrier 13. This planet carrier 13 is connected with the outer gear ring 18 of the third epicyclic gear train and since the sun wheel 22 of this gear train is now held stationary by the action of the brake 25, the planet carrier 19, and with it the shaft 20 is driven from the planet carrier 13. In each of the three epicyclic gear trains a reduction in speed of revolution is effected, and with it an increase in torque.

In the second forward speed, the brake 24 is applied and the clutch 27 is closed, the brake 25 being at the same time released. With the release of the brake 25 and the engagement of the clutch 27 the gear members of the third epicyclic gear train are rigidly connected with one another. In the second forward speed, therefore, the driven shaft 20 is driven without further reduction by the outer gear ring 18 of this third gear train.

For the third forward speed, however, only the third epicyclic gear train 18, 19, 21, 22 is utilized, the brake 25 being applied, with simultaneous release of the brake 24, and the clutch 26 being closed. The driving is now effected from the outer gear ring 18 of the third epicyclic gear train, which is rigidly connected with the driving shaft 4 through the now locked first and second epicyclic gear trains. Since the sun wheel 22 is held stationary by means of the brake 25, the driven shaft 20, the speed having been once reduced, is driven by way of the planet carrier 19.

For the fourth forward speed, which is also known as direct drive, only the two clutches 26 and 27 are engaged, whereby the three epicyclic gear trains are locked solid and the driving shaft 4 is connected with the driven shaft 20 by way of the friction clutches 26 and 27.

In reverse, the brakes 23 and 25 are applied. By the brake 23 the planet carrier 8, and with it the outer gear ring 11 of the second epicyclic gear train, are held stationary. In this condition, the outer gear ring 6 of the first epicyclic gear train rotates the sun gear 9. Since this sun gear is connected for unit rotation with the sun gear 14 of the second epicyclic gear train this sun gear 14 is also rotated and drives, with reduction in speed of revolution, the planet carrier 13 and with it the outer gear ring 18 of the third epicyclic gear train. Since the brake 25 holds the sun wheel 22 stationary, the outer gear ring 18 now drives the driven shaft 20, by way of the planet carrier 19, with a further reduction in speed. Since with this reverse drive the sun wheel 9 is driven by the larger diameter gear ring 6 an increase of speed is obtained. This increase in speed, however, is but small, and may in practice be counterbalanced to a sufficient extent by reductions in speed in the two further epicyclic gear sets.

In the constructional example illustrated the double epicyclic gear constituted by combining the two epicyclic gear trains 6, 7, 8, 9 and 11, 12, 13, 14 into a unit, is followed by an epicyclic gear train 18, 19, 21, 22.

I claim:

1. In an epicyclic gear including input and output shafts, first and second epicyclic gear trains connected between said shafts, each said gear train including inner and outer gear element with intermediate planet pinions carried by a planet carrier and intermeshing with said inner and outer gears, means drivingly connecting one gear element of the first gear train with the said input shaft so that the drive onto said first gear train from the input shaft is taken from the outer gear ring of said gear train, means drivingly connecting the planet carrier of the second gear train with the said output shaft so that the drive onto the output shaft is taken from said planet carrier, means continuously coupling the outer gear element of the first gear train to rotate as a unit with one of the gear elements of the second gear train, means continuously connecting the planet carrier of the first gear train to rotate as a unit with the outer gear element of the said second gear train, said outer gear ring of the second gear train being contained within the outer gear ring of the first gear train, means for applying a braking effort to said gear trains to provide different gear ratios, and means for locking the gear trains to provide a direct drive.

2. In an epicyclic gear, including input and output shafts, first and second epicyclic gear trains, each said gear train including a sun gear, an outer ring gear and planet pinions carried by a planet carrier, means drivingly connecting the outer ring gear of the first gear train with said input shaft so that the drive onto said first gear train from the input shaft is taken from the outer gear ring of said gear train, means drivingly connecting the planet carrier of the second gear train with the said output shaft so that the drive onto said output shaft is taken from said planet carrier, means drivingly connecting the outer gear ring of the second gear train to rotate as a unit with the planet carrier of the first gear train, said outer gear ring of the second gear train being contained within the outer gear ring of the first gear train, means continuously coupling the sun gears of the two gear trains for unitary rotation, means for applying a braking effort to said units to reverse the direction of rotation of said output shaft, and means for locking the gear trains solid to provide a direct drive.

3. In an epicyclic gear, including input and output shafts, first and second epicyclic gear trains, each said gear train including a sun gear, an outer ring gear and planet pinions carried by a planet carrier, means drivingly connecting the outer ring gear of the first gear train with said input shaft so that the drive onto said first gear train from the input shaft is taken from the outer gear ring of said first gear train, said connecting means encompassing said second gear train, means drivingly connecting the planet carrier of the second gear train with the said output shaft so that the drive onto said output shaft is taken from said planet carrier, means drivingly connecting the outer gear ring of the second gear train to rotate as a unit with the planet carrier of the first gear train, means continuously connecting the sun gears of the two gear trains for rotation as a unit, and means for applying a braking effort to said units to reverse the direction of rotation on said output shaft.

4. In an epicyclic gear, including input and output shafts, first and second epicyclic gear trains, each said gear train including a sun gear, an outer ring gear and planet pinions carried by a planet carrier, means drivingly connecting the outer ring gear of the first gear train with said input shaft so that the drive onto said first gear train from the input shaft is taken from the outer gear ring of said first gear train, said connecting means encompassing said second gear train, means drivingly connecting the planet carrier of the second gear train with the said output shaft so that the drive onto said output shaft is taken from said planet carrier, means drivingly connecting the outer gear ring of the second gear train to rotate as a unit with the planet carrier of the first train, shaft means continuously interconnecting and supporting the sun gears of the said two gear trains for unitary rotation in side by side relation, means for applying a braking effort to said unit and to said shaft to provide different senses of rotation on said output shaft, and means for locking the gear trains solid to provide a direct drive.

References Cited in the file of this patent

UNITED STATES PATENTS

| | | |
|---|---|---|
| 2,123,769 | Cotal | July 12, 1938 |
| 2,580,656 | Clerk | Jan. 1, 1952 |

FOREIGN PATENTS

| | | |
|---|---|---|
| 387,623 | France | July 18, 1908 |
| 614,340 | France | Dec. 11, 1926 |